United States Patent
Na et al.

(10) Patent No.: US 8,204,478 B2
(45) Date of Patent: Jun. 19, 2012

(54) SYSTEM FOR SETTING SECURITY IN WIRELESS NETWORK SYSTEM USING CLUSTER FUNCTION AND METHOD OF CONTROLLING THE SAME

(75) Inventors: Hyun-Jung Na, Suwon-si (KR); Soo-Seob Won, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 440 days.

(21) Appl. No.: 12/321,832

(22) Filed: Jan. 26, 2009

(65) Prior Publication Data
US 2009/0191847 A1    Jul. 30, 2009

(30) Foreign Application Priority Data
Jan. 29, 2008   (KR) .................. 10-2008-0009228

(51) Int. Cl.
*H04M 1/68* (2006.01)
(52) U.S. Cl. .................... 455/411; 370/331; 455/410
(58) Field of Classification Search .................. 455/403, 455/410, 411, 432.1, 433, 434, 435.1, 436–439, 455/442; 370/331
See application file for complete search history.

(56) References Cited

U.S. PATENT DOCUMENTS

| 5,095,529 | A * | 3/1992 | Comroe et al. ............. 455/16 |
| 2003/0166397 | A1 * | 9/2003 | Aura ............................ 455/410 |
| 2004/0003285 | A1 * | 1/2004 | Whelan et al. .............. 713/201 |
| 2004/0077335 | A1 * | 4/2004 | Lee et al. ..................... 455/410 |
| 2004/0198220 | A1 * | 10/2004 | Whelan et al. .............. 455/41.1 |
| 2006/0083200 | A1 * | 4/2006 | Emeott et al. ............... 370/331 |
| 2008/0299966 | A1 * | 12/2008 | Masuda ....................... 455/432.1 |
| 2010/0091733 | A1 * | 4/2010 | Hahn et al. .................. 370/331 |

OTHER PUBLICATIONS

IEEE, "IEEE Standard for Information Technology—Telecommunications and information exchange between systems—Local and metropolitan area networks—Specific requirements, Part 11: Wireless LAN Medium Access Control (MAC) and Physical Layer (PHY) Specifications, Amendment 2: Fast Basic Service Set (BSS) Transition", IEEE Computer Society, IEEE Std 802.11r—Jul. 15, 2008, 124 pages.

* cited by examiner

Primary Examiner — Kent Chang
Assistant Examiner — Dinh P Nguyen

(57) ABSTRACT

A system for setting security in a wireless network system using a cluster function. An access point stores a list of candidate terminals of each neighboring access point. When an arbitrary terminal sends an access request, the access point determines whether or not the terminal is authenticated using the stored list of candidate terminals, and transmits an authentication success message to the requesting terminal if the requesting terminal is authenticated. The terminal performs hand-over to the access point without performing authentication upon receiving the authentication success message from the access point in response to the access request. Thus, the hand-over time of a Wi-Fi phone is reduced in an environment based on Wi-Fi Protected Access (WPA) that is one of the strongest wireless LAN security policies, so that the safety and mobility of wireless LAN services can be improved at the same time.

13 Claims, 7 Drawing Sheets

SYSTEM FOR SETTING SECURITY IN WIRELESS NETWORK SYSTEM USING CLUSTER FUNCTION AND METHOD OF CONTROLLING THE SAME

CROSS-REFERENCE TO RELATED APPLICATION(S) AND CLAIM OF PRIORITY

The present application claims the benefit under 35 U.S.C. §119(a) of a Korean patent application filed in the Korean Intellectual Property Office on Jan. 29, 2008 and there duly assigned Serial No. 10-2008-0009228, the entire disclosure of which is hereby incorporated by reference.

TECHNICAL FIELD OF THE INVENTION

The present invention relates to a system for setting security in a wireless network system using a cluster function and a method of controlling the same.

BACKGROUND OF THE INVENTION

In a Wireless Fidelity (Wi-Fi) phone in motion, a hand-over time is a very important factor in the quality of speech.

The Wi-Fi phone provides access to a new access point of another wireless Local Area Network (LAN) while in motion. At this time, the Wi-Fi phone goes through a series of processes for the access.

The access to the new access point must be provided quickly enough as not to be recognized by a phone user.

If the hand-over time is delayed, the phone user experiences mute or call disconnection.

The hand-over time is dependent on how security is set for the wireless LAN.

The security of the wireless LAN is based on Open (encryption-free) and various encryption standards such as Wired Equivalent Privacy (WEP), Wi-Fi Protected Access-Pre Shared Key (WPA-PSK), and Wi-Fi Protected Access (WPA). Among them, the WPA has the highest security level but the longest hand-over time.

Figure 1A:
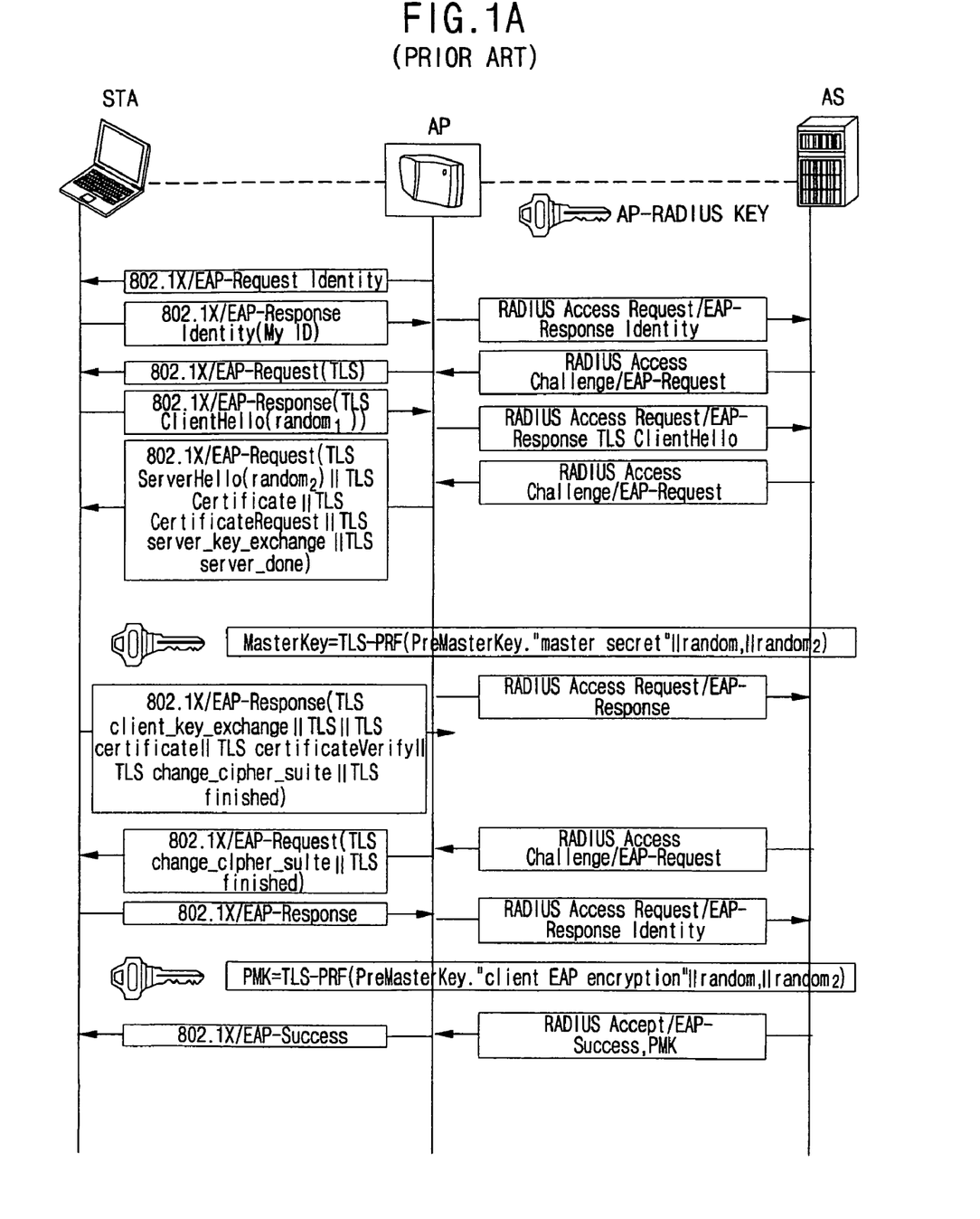
FIG. 1A illustrates a typical process for 802.1x authentication.
Figure 1B:
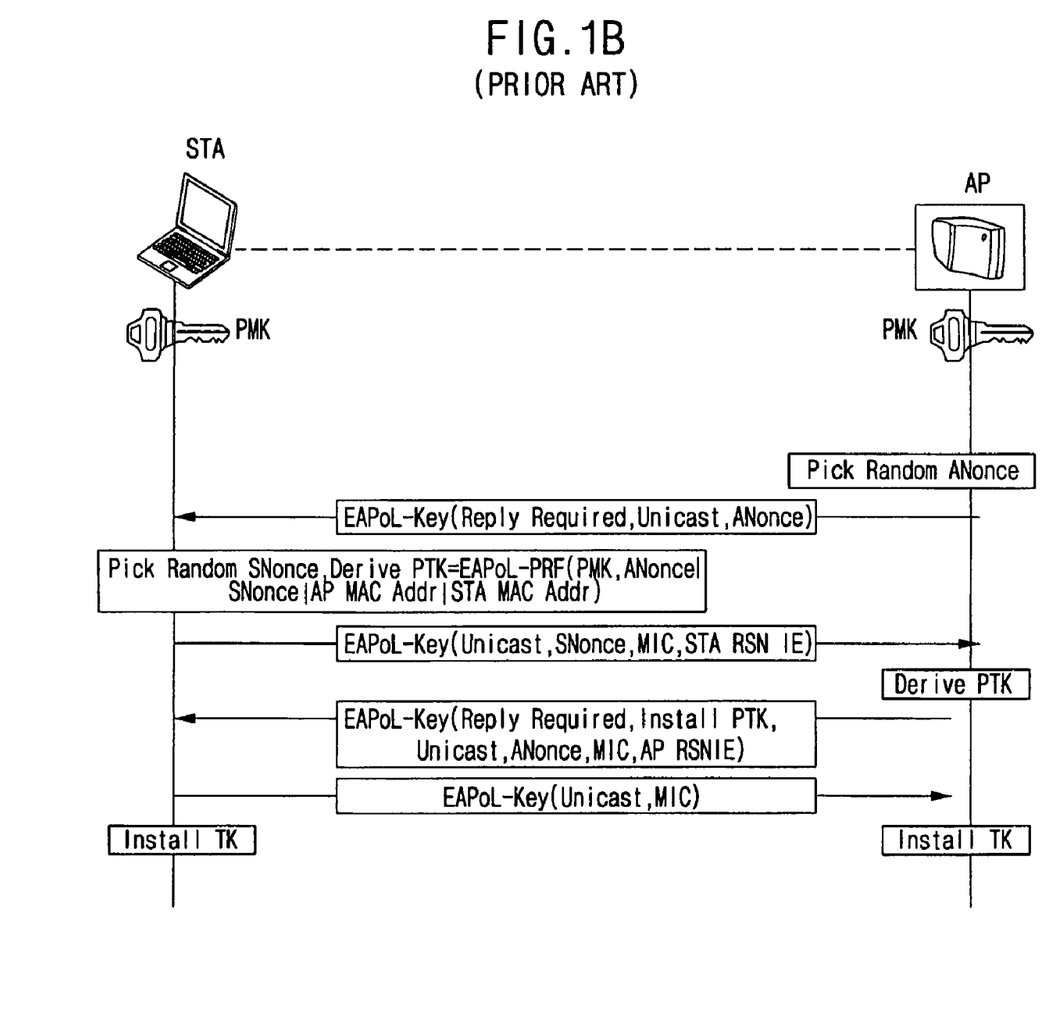
FIG. 1B illustrates a typical process for data encryption key generation (based on a "way handshaking" scheme)

An accessing process based on the WPA includes 802.1x authentication as illustrated in FIG. 1A, and generation of a data encryption key as illustrated in FIG. 1B.

Particularly, the 802.1x authentication takes much time because an authentication server (i.e., a Remote Authentication Dial-In User Service (RADIUS) server) interworks with the access point and terminals to transceive many messages, and thus has difficulty ensuring continuous hand-over.

Thus, studies are presently being made to reduce the hand-over time.

The representative study is Fast BSS Transition of IEEE802.11r.

However, the proposals of these studies are ongoing in an unstandardized state, and are considerably modified and complicated in comparison with an existing authentication scheme. As such, these schemes have a great difficult with easy application.

Further, in the light of to which access point the terminal provides access in the future, its range is not fixed, and thus it is difficult to easily handle a security aspect in order to ensure fast hand-over to any access point.

SUMMARY OF THE INVENTION

To address the above-discussed deficiencies of the prior art, it is a primary object to provide a system for setting security in a wireless network system using a cluster function, which can get services for a predetermined time without additional authentication and without interruption, and a method of controlling the same.

According to an aspect of the invention, there is provided a system for setting security in a wireless network system using a cluster function. The system includes an access point storing a list of candidate terminals of each neighboring access point, determining, when a neighboring terminal sends an access request, whether or not a terminal is authenticated using the stored list of candidate terminals, and transmitting an authentication success message to the terminal if the terminal is authenticated; and the terminal performing handover to the access point without performing authentication when receiving the authentication success message from the access point in response to the access request.

In an embodiment of the present invention, the access point may include a storage storing the list of candidate terminals; a list manager updating the stored list of candidate terminals upon receiving information about the list of candidate terminals from any one of the neighboring access points; and a terminal authentication processor checking whether or not the terminal is authenticated using the list of candidate terminals of the storage when the terminal requests access, and transmitting the authentication success message to the terminal if the terminal is authenticated.

In another embodiment of the present invention, the list manager may update the list of candidate terminals with information about the terminal when performing authentication on the terminal through an authentication server, and transmit the information about the list of candidate terminals to the neighboring access points to share the information with the neighboring access points.

In another embodiment of the present invention, the list of candidate terminals of each neighboring access point may include a Media Access Control (MAC) address of the authenticated terminal, a MAC address of the clustered access point, an encryption key, and an authentication time.

In another embodiment of the present invention, the terminal authentication processor may perform an existing authentication process on the requesting terminal if the requesting terminal is not authenticated using the list of candidate terminals.

According to another aspect of the invention, there is provided a method of controlling a system for setting security in a wireless network system using a cluster function. The method includes steps of storing, by an access point having a cluster function, a list of candidate terminals of neighboring access points, and when a neighboring terminal sends an access request, determining whether or not the terminal is authenticated using the stored list of candidate terminals; and transmitting, by the access point, an authentication success message to the terminal if the terminal is authenticated using the stored list of candidate terminals.

In an embodiment of the present invention, the method may further include steps of performing, by the access point, authentication on the terminal through an authentication server if the terminal is not authenticated using the stored list of candidate terminals; updating, by the access point, the list of candidate terminals with information about the authenticated terminal; and transmitting, by the access point, information about the updated list of candidate terminals to the neighboring access points and sharing the information with the neighboring access points.

In another embodiment of the present invention, the transmitting and sharing of information about the updated list of candidate terminals are performed through encryption.

In another embodiment of the present invention, the method may further include steps of determining, by the access point, whether or not the information about the updated list of candidate terminals is received from any one of the neighboring access points; and if the information about the updated list of candidate terminals is received, updating, by the access point, the stored list of candidate terminals with the received information about the updated list of candidate terminals.

In another embodiment of the present invention, the list of candidate terminals of each neighboring access point includes a Media Access Control (MAC) address of the authenticated terminal, a MAC address of the clustered access point, an encryption key, and an authentication time.

According to a further aspect of the invention, there is provided a method of controlling a system for setting security in a wireless network system using a cluster function. The method includes steps of sending, by a terminal, an access request to a neighboring access point in order to perform hand-over; determining, by the terminal, whether or not an authentication success message is received from the neighboring access point; and handing-over, by the terminal, to the neighboring access point if an authentication success message is received from the neighboring access point.

In an embodiment of the present invention, the handing-over includes enabling the terminal to use a value of a previously authenticated encryption key without generating a value of a new encryption key.

In another embodiment of the present invention, the method may further include a step of enabling, by the terminal, the neighboring access point to perform authentication on the terminal through an authentication server if an authentication success message is not received from the neighboring access point.

As described above, according to embodiments of the present invention, the system for setting security in a wireless network system using a cluster function and the method of controlling the same can reduce the hand-over time of a Wi-Fi phone in an environment based on Wi-Fi Protected Access (WPA) that is one of the strongest wireless LAN security policies, and thus improve the safety and mobility of wireless LAN services at the same time.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 2 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Figure 2:
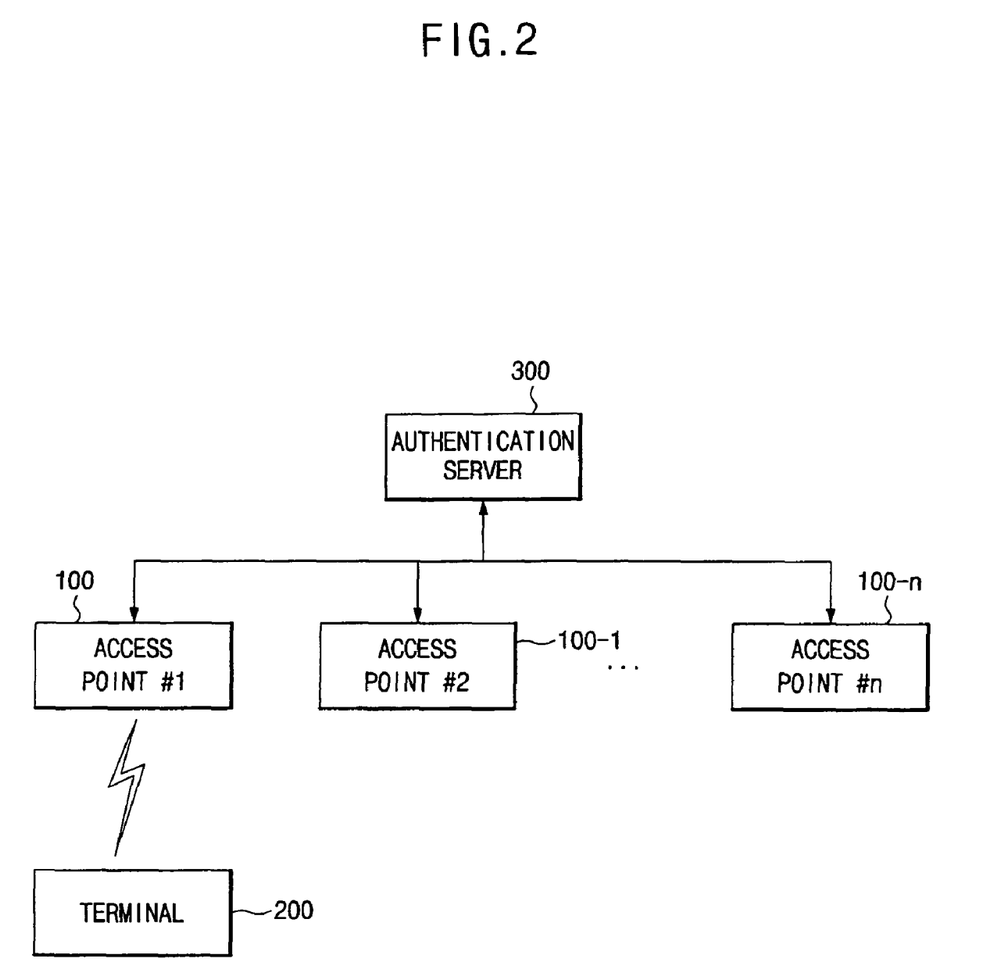
FIG. 2 is a block diagram illustrating a system for setting security using a cluster function in a wireless network system according to an embodiment of the present invention.

FIG. 2 is a block diagram illustrating a system for setting security using a cluster function in a wireless network system according to an embodiment of the present invention. The security setting system includes one or more access points 100, 100-1, ..., 100-n, at least one terminal 200 such as a cell phone, and an authentication server 300.

Figure 3:
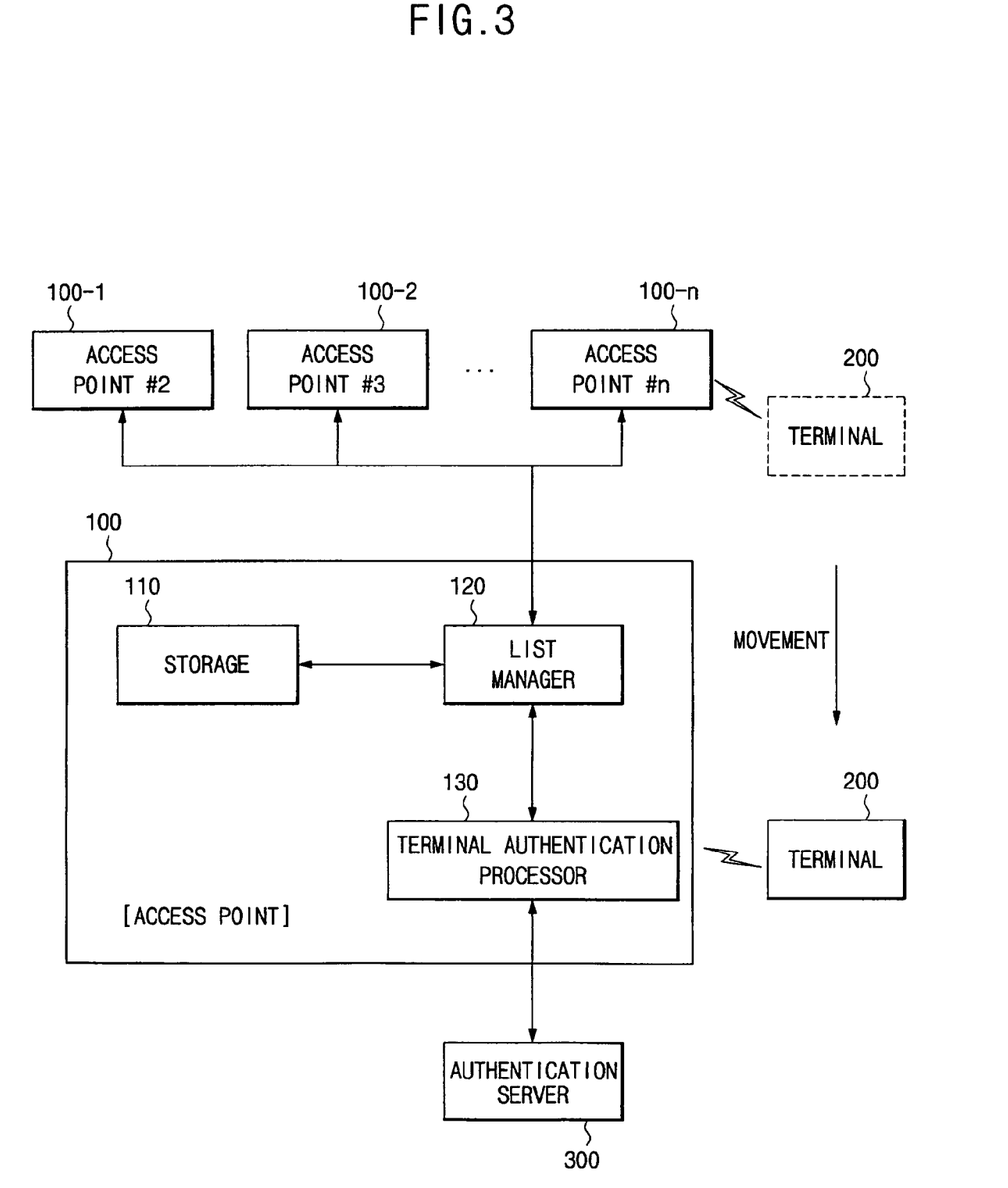
FIG. 3 is a functional block diagram illustrating the detailed configuration of an access point in the system for setting security in a wireless network system using the cluster function as illustrated in FIG. 2 according to an embodiment of the present invention.

Among the access points, one access point 100 stores a list of candidate terminals of each of the neighboring access points 100-1, ..., 100-n. When an arbitrary terminal 200 requests access, the access point 100 determines whether or not the requesting terminal 200 is authenticated using the stored list of candidate terminals, and then transmits an authentication success message to the requesting terminal 200 if the requesting terminal 200 is authenticated. To this end, the access point 100 includes a storage 110, a list manager 120, and a terminal authentication processor 130, as illustrated in FIG. 3. Any access points 100, 100-1, ..., 100-n encrypt the list of candidate terminals when the list of candidate terminals is transmitted.

The storage 110 of the access point 100 stores the list of candidate terminals of each of the neighboring access points 100-1, ..., 100-n. Here, the list of candidate terminals includes a Media Access Control (MAC) address of the authenticated terminal 200, a MAC address of the clustered access point 100, an encryption key, and an authentication time. Here, the term "clustered" means that one or more access points are managed as a group. The group of access points shares information about the list of candidate terminals with each other.

The list manager 120 of the access point 100 updates the stored list of candidate terminals when information about the list of candidate terminals is received from any one of the neighboring access points 100-1, . . . , 100-n. Here, the list manager 120 updates the list of candidate terminals with information about the terminal 200 when the access point 100 performs authentication on the terminal 200 through the authentication server 300, and simultaneously transmits and shares the information about the list of candidate terminals to and with the neighboring access points 100-1, . . . , 100-n.

Further, when the arbitrary terminal 200 requests access, the terminal authentication processor 130 of the access point 100 checks whether or not the requesting terminal 200 is authenticated using the list of candidate terminals of the storage 110. If the requesting terminal 200 is an authenticated terminal, the terminal authentication processor 130 transmits an authentication success message to the requesting terminal 200. Meanwhile, if the requesting terminal 200 is not authenticated using the list of candidate terminals, the terminal authentication processor 130 performs existing authentication on the requesting terminal 200.

On the other hand, in the event of hand-over, the arbitrary terminal 200 requests access to any one of the neighboring access points and then receives the authentication success message from the requested neighboring access point. In this case, the requesting terminal 200 performs hand-over to the requested neighboring access point without performing authentication on the requested neighboring access point.

The aforementioned components will be described regarding their operations associated with the subject matter of the present invention, instead of typical functions and detailed operations.

First, the terminal 200 requests access to the access point 100.

Then, the terminal authentication processor 130 of the requested access point 100 checks whether or not the requesting terminal 200 is authenticated using a list of candidate terminals stored in the storage 110. Here, the list of candidate terminals includes a MAC address of the authenticated terminal 200, a MAC address of the clustered access point 100, an encryption key, and an authentication time.

If the requesting terminal 200 is not an authenticated terminal, the terminal authentication processor 130 of the access point 100 not only performs 801.1x authentication but also generates a data encryption key using the authentication server 300, as illustrated in FIGS. 1A and 1B.

Using both information about the authenticated terminal 200 and information about the generated data encryption key in the aforementioned process, the list manager 120 of the access point 100 updates the list of candidate terminals stored in the storage 100.

Afterwards, when the list of candidate terminals are updated, the list manager 120 of the access point 100 transmits and shares the information about the list of candidate terminals to and with the surrounding clustered access points 100-1, . . . , 100-n.

In contrast, if the requesting terminal 200 is authenticated, the terminal authentication processor 130 of the access point 100 transmits an authentication success message to the requesting terminal 200, thereby omitting authentication and the data encryption key generation with respect to the requesting terminal 200. Further, the corresponding access point 100 and terminal 200 use a preset encryption key without generating a separate encryption key because they already know the encryption key through the information about the list of candidate terminals.

Upon receiving the information about the list of candidate terminals from the neighboring access point 100-1, . . . , 100-n, the list manager 120 of the access point 100 updates the list of candidate terminals.

Meanwhile, in the event of hand-over, when the terminal 200 requests access to any one of the neighboring access points and then receives an authentication success message, the requesting terminal 200 performs hand-over to the corresponding neighboring access point without performing authentication on the corresponding neighboring access point.

Figure 4:
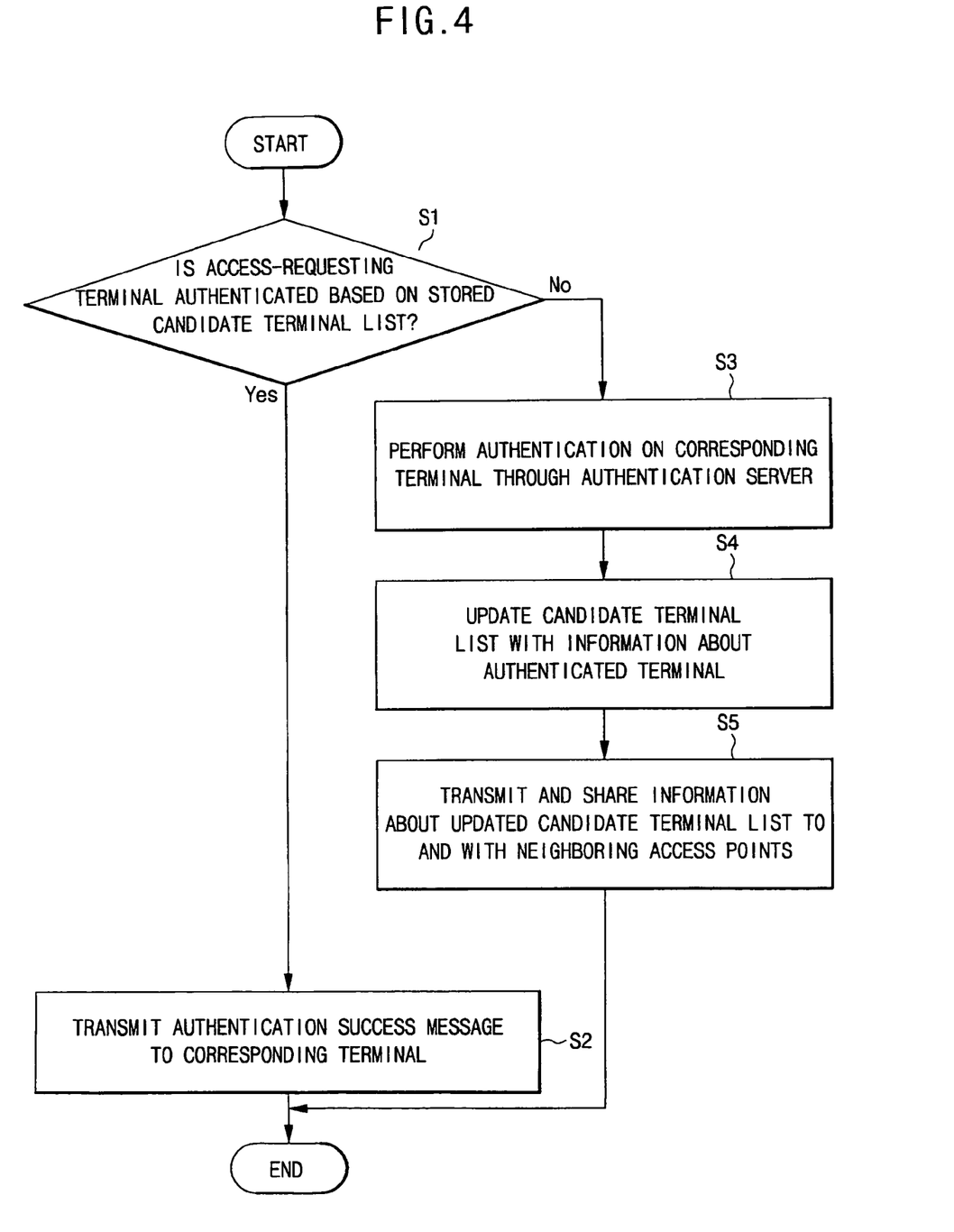
FIG. 4 is a flow chart illustrating a method of controlling a system for setting security in a wireless network system using a cluster function according to an embodiment of the present invention.

Now, a method of controlling the system for setting security in a wireless network system using a cluster function will be described with reference to FIG. 4.

First, when an arbitrary terminal 200 requests access, the access point 100, which stores a list of candidate terminals of each of the neighboring access points 100-1, . . . , 100-n, determines whether or not the requesting terminal 200 is authenticated using the stored list of candidate terminals (S1).

At this time, if the requesting terminal 200 is authenticated using the stored list of candidate terminals (Yes in step S1), the access point 100 transmits an authentication success message to the requesting terminal 200 (S2).

In contrast, if the requesting terminal 200 is not authenticated using the stored list of candidate terminals (No in step S1), the access point 100 performs the authenticating process on the requesting terminal 200 through the authentication server 300 (S3).

Then, the access point 100 updates the list of candidate terminals with information about the authenticated terminal 200 (S4).

Subsequently, the access point 100 transmits information about the updated list of candidate terminals to the neighboring access points and shares the information with the latter (S5).

At this time, the information about the updated list of candidate terminals in step S5 is transmitted through encryption.

Figure 5:
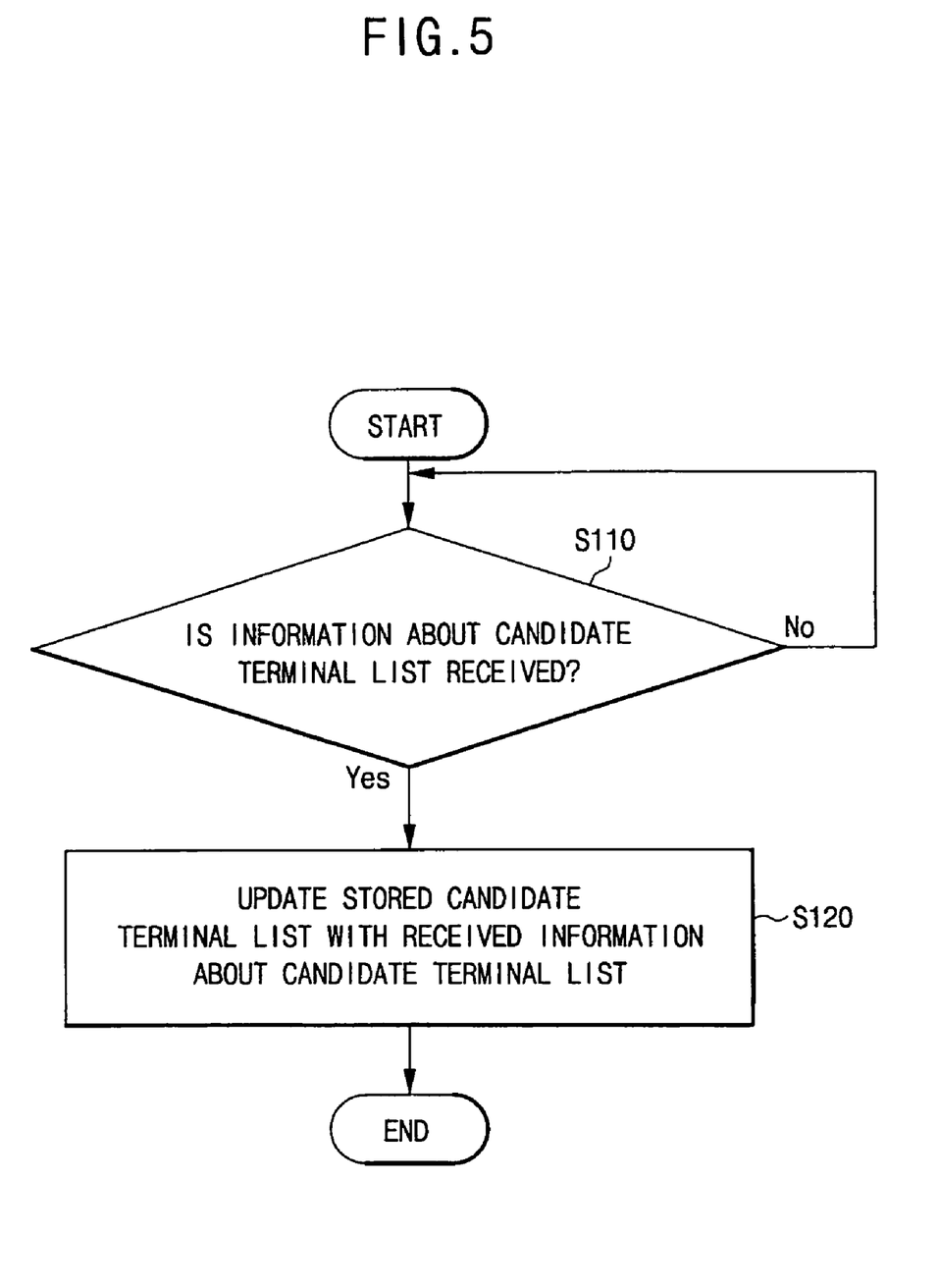
FIG. 5 is a flow chart illustrating a process in which any access point manages a list of candidate terminals in a method of controlling a system for setting security in a wireless network system using a cluster function according to an embodiment of the present invention.

Meanwhile, the operation of the access point in the method of controlling the security setting system will be described with reference to FIG. 5.

In the method of controlling the security setting system, it is determined whether or not the access point 100 receives information about a list of candidate terminals from any one of the neighboring access points (S110).

If the access point 100 receives information about a list of candidate terminals (Yes in step S110), the access point 100 updates a stored list of candidate terminals with the received information about the list of candidate terminals (S120). Here, the list of candidate terminals of the access point 100 includes a MAC address of the authenticated terminal 200, a MAC address of the clustered access point 100, an encryption key, and an authentication time.

Figure 6:
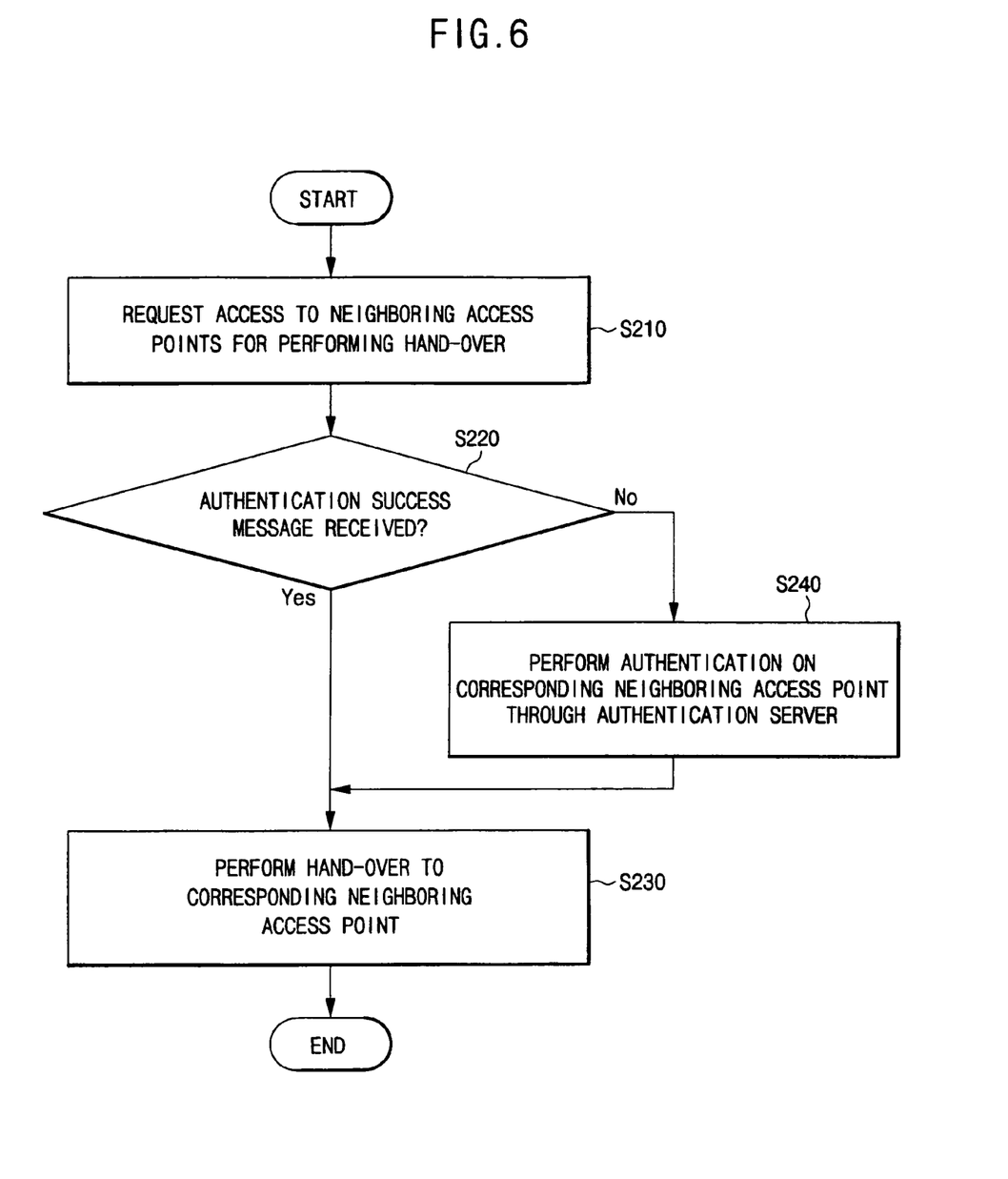
FIG. 6 is a flow chart illustrating the controlling process of a terminal in a method of controlling a system for setting security in a wireless network system using a cluster function according to an embodiment of the present invention.

On the other hand, the operation of the terminal in the method of controlling the security setting system will be described with reference to FIG. 6.

First, the terminal 200 requests access to the neighboring access points in order to perform hand-over (S210).

Then, the requesting terminal 200 checks whether or not the requesting terminal 200 has received an authentication success message from any one of the neighboring access points (S220).

If the terminal 200 receives an authentication success message (Yes in step S220), the terminal 200 determines that the corresponding neighboring access point completes authentication, and thus hands over to the corresponding neighboring access point (S230).

In contrast, if the terminal 200 does not receive an authentication success message (No in step S220), the terminal 200 and the corresponding neighboring access point perform authentication through the authentication server 300 (S240).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A system for setting security in a wireless network system, the system comprising:
an access point storing a list of candidate terminals of one or more neighboring access points, determining, upon receipt of an access request from a neighboring terminal, whether or not the neighboring terminal is authenticated using the stored list of candidate terminals, and transmitting an authentication success message to the neighboring terminal if the neighboring terminal is authenticated,
wherein the neighboring terminal performs hand-over to the access point without performing authentication upon receiving the authentication success message from the access point, and
wherein the access point and the neighboring terminal use an encryption key generated and stored in advance without generating a separate encryption key when the authentication is completed by transmitting and receiving the authentication success message.

2. The system according to claim 1, wherein the access point includes:
a storage storing the list of candidate terminals;
a list manager updating the stored list of candidate terminals upon receiving information about the list of candidate terminals from any one of the one or more neighboring access points; and
a terminal authentication processor determining whether or not the terminal is authenticated using the list of candidate terminals of the storage when the neighboring terminal requests access, and transmitting the authentication success message to the neighboring terminal if the neighboring terminal is authenticated.

3. The system according to claim 2, wherein the list manager updates the list of candidate terminals with information about the neighboring terminal when performing authentication on the neighboring terminal through an authentication server, and transmits the information about the list of candidate terminals to the neighboring one or more access points.

4. The system according to claim 2, wherein the list of candidate terminals of each access point includes a Media Access Control (MAC) address of the authenticated terminal, a MAC address of the clustered access point, an encryption key, and an authentication time.

5. The system according to claim 2, wherein the terminal authentication processor performs an existing authentication process on the neighboring terminal if the neighboring terminal is not authenticated using the list of candidate terminals.

6. The system according to claim 5, wherein the access point transmits the list of candidate terminals by means of encryption.

7. A method of controlling a system for setting security in a wireless network system, the method comprising:
storing, by an access point having a cluster function, a list of candidate terminals of one or more neighboring access points,
upon receiving an access request from a neighboring terminal, determining whether or not the neighboring terminal is authenticated using the stored list of candidate terminals;
transmitting, by the access point, an authentication success message to the neighboring terminal if the neighboring terminal is authenticated using the stored list of candidate terminals; and
using, by the access point, an encryption key generated and stored in advance without generating a separate encryption key when the authentication is completed by transmitting and receiving the authentication success message.

8. The method according to claim 7, further comprising:
performing, by the access point, authentication on the neighboring terminal through an authentication server if the neighboring terminal is not authenticated using the stored list of candidate terminals;
updating, by the access point, the list of candidate terminals with information about the authenticated terminal; and
transmitting, by the access point, information about the updated list of candidate terminals to the neighboring one or more access points.

9. The method according to claim 8, wherein the transmitting of information about the updated list of candidate terminals is performed through encryption.

10. The method according to claim 8, further comprising:
determining, by the access point, whether or not information about an updated list of candidate terminals is received from any one of the one or more neighboring access points; and
if information about an updated list of candidate terminals is received, updating, by the access point, the stored list of candidate terminals with the received information about the updated list of candidate terminals.

11. The method according to claim 8, wherein the list of candidate terminals of each neighboring access point includes a Media Access Control (MAC) address of the authenticated terminal, a MAC address of the clustered access point, an encryption key, and an authentication time.

12. A method of controlling a system for setting security in a wireless network system, the method comprising:
sending, by a terminal, an access request to a neighboring access point in order to perform hand-over;
determining, by the terminal, whether or not an authentication success message is received from the neighboring access point;
handing-over, by the terminal, to the neighboring access point if an authentication success message is received from the neighboring access point, wherein the terminal is authenticated using a stored list of candidate terminals; and
using, by the terminal, an encryption key generated and stored in advance without generating a separate encryption key when the authentication is completed by transmitting and receiving the authentication success message.

13. The method according to claim 12, further comprising enabling, by the terminal, the neighboring access point to perform authentication on the terminal through an authentication server if an authentication success message is not received from the neighboring access point.

* * * * *